(12) United States Patent
Muegge et al.

(10) Patent No.: US 12,031,693 B2
(45) Date of Patent: Jul. 9, 2024

(54) LIGHTING DEVICE FOR VEHICLES

(71) Applicant: HELLA GmbH & Co. KGaA, Lippstadt (DE)

(72) Inventors: Martin Muegge, Geseke (DE); Martin Vollmer, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/381,008

(22) Filed: Oct. 17, 2023

(65) Prior Publication Data

US 2024/0125449 A1    Apr. 18, 2024

(30) Foreign Application Priority Data

Oct. 18, 2022  (DE) .......................... 102022127222.2

(51) Int. Cl.
| | |
|---|---|
| *F21S 43/241* | (2018.01) |
| *F21S 43/14* | (2018.01) |
| *F21S 43/249* | (2018.01) |
| *F21S 43/31* | (2018.01) |
| *F21Y 105/12* | (2016.01) |
| *F21Y 115/10* | (2016.01) |

(52) U.S. Cl.
CPC ............. *F21S 43/241* (2018.01); *F21S 43/14* (2018.01); *F21S 43/249* (2018.01); *F21S 43/31* (2018.01); *F21Y 2105/12* (2016.08); *F21Y 2115/10* (2016.08)

(58) Field of Classification Search
CPC ........ F21S 43/241; F21S 43/249; F21S 43/14; F21S 43/31
See application file for complete search history.

(56) References Cited

U.S. PATENT DOCUMENTS

| | | | | |
|---|---|---|---|---|
| 5,506,929 | A | * | 4/1996 | Tai .......................... F21S 43/14 385/146 |
| 5,615,090 | A | * | 3/1997 | Kato ....................... F21S 41/24 385/32 |
| 7,338,197 | B2 | * | 3/2008 | Inditsky ............... G02B 6/0043 362/625 |

(Continued)

FOREIGN PATENT DOCUMENTS

| | | |
|---|---|---|
| DE | 102010006348 A1 | 8/2011 |
| DE | 102013104169 A1 | 10/2014 |

(Continued)

*Primary Examiner* — Bryon T Gyllstrom
(74) *Attorney, Agent, or Firm* — Muncy, Geissler, Olds & Lowe, P.C.

(57) ABSTRACT

A lighting device for vehicles with a first lighting unit having a light source and a light beam surface for emitting light and with a second lighting unit containing a light source and a flat light guide having opposite flat sides and narrow sides connecting the same for backlighting the first lighting unit. The flat light guide of the second lighting unit has a backlighting section and a linear light section. The backlighting section is arranged behind the first lighting unit and a front flat side of the flat light guide in the backlighting section serves as a light decoupling surface for the light decoupling of a first part of the light coupled into the flat light guide. The linear light section is at least partially arranged next to the first lighting unit. A narrow side of the flat light guide serves as a light decoupling line.

15 Claims, 4 Drawing Sheets

(56) References Cited

U.S. PATENT DOCUMENTS

| | | | | |
|---|---|---|---|---|
| 2004/0208016 A1* | 10/2004 | Kazaoka | ............... | F21S 43/243 |
| | | | | 362/511 |
| 2007/0047249 A1* | 3/2007 | Kogo | ................... | F21S 43/315 |
| | | | | 362/517 |
| 2010/0008088 A1* | 1/2010 | Koizumi | ................. | F21S 43/14 |
| | | | | 362/235 |
| 2011/0216549 A1* | 9/2011 | Futami | ................. | B60Q 1/0041 |
| | | | | 362/520 |
| 2014/0169016 A1* | 6/2014 | Kirchner | .............. | F21S 43/239 |
| | | | | 362/511 |
| 2019/0293857 A1* | 9/2019 | Martoch | ............. | G02B 6/0018 |

FOREIGN PATENT DOCUMENTS

| | | |
|---|---|---|
| DE | 102019128342 A1 | 4/2021 |
| DE | 102020207459 A1 | 12/2021 |

\* cited by examiner

LIGHTING DEVICE FOR VEHICLES

This nonprovisional application claims priority under 35 U.S.C. § 119(a) to German Patent Application No. 10 2022 127 222.2, which was filed in Germany on Oct. 18, 2022, and which is herein incorporated by reference.

BACKGROUND OF THE INVENTION

Field of the Invention

The invention relates to a lighting device having a first lighting unit comprising a light source and a light beam surface for emitting light and, having a second lighting unit, containing a light source and a flat light guide having opposite flat sides and narrow sides connecting the same for backlighting the first lighting unit.

Description of the Background Art

From DE 10 2013 104 169 A1 a lighting device for vehicles is known, which comprises two lighting units arranged one behind the other in the main beam direction. A rear lighting unit has a light source and a flat light guide into which light emitted by the light source is coupled on one narrow side, transmitted via opposite flat sides by total reflection and decoupled on a front flat side in the main beam direction under illumination of the front lighting unit. The flat light guide has corresponding decoupling elements on a rear flat side for decoupling.

From DE 10 2019 128 342 A1 a lighting device for vehicles with a lighting unit and with a liquid crystal field arranged in the main beam direction in front of said lighting unit is known. Liquid crystal pixels of the liquid crystal field are controllable for the controlled transmission of light emitted by the rear lighting unit. The lighting unit comprises a flat light guide, on one of the narrow sides of which a light source is arranged to couple the light into the flat light guide. The flat light guide has opposite flat sides on which the coupled light is totally reflected. Decoupling elements are arranged on the rear flat side so that light hitting them is reflected in the direction of the front flat side. This results in a decoupling of the light on the front flat side.

SUMMARY OF THE INVENTION

It is therefore an object of the present invention to further develop a lighting device for vehicles containing a flat light guide arranged behind a lighting unit in such a way that the lighting functionality of the lighting device is easily extended.

To achieve this object, the flat light guide of the second lighting unit can have a backlighting section and a linear light section adjoining the backlighting section, wherein the backlighting section can be arranged behind the first lighting unit and wherein a front flat side of the flat light guide in the backlighting section may serve as a light decoupling surface to decouple a first part of the light coupled into the flat light guide, and wherein the linear light section can be at least partially arranged next to the first lighting unit, wherein a narrow side of the flat light guide in the linear light section can serve as a light decoupling line for decoupling the light of a second part of the light coupled into the flat light guide.

An advantage of the invention is that the lighting functionality of the lighting device is extended in a simple and space-saving manner. A second lighting unit located behind a first lighting unit containing a flat light guide can have a backlighting section that decouples light on a front flat side of the flat light guide in the direction of the front first lighting unit for illumination of the same. In addition, the flat light guide can have a linear light section which is not located behind the first lighting unit, but essentially next to it, so that light can be emitted from the linear light section according to a linear light signature, bypassing the first lighting unit. The light emitted by the linear light section can be used to generate a predefined signal function, such as taillight, brake light, direction indicator light or daytime running light.

For example, the linear light section with its light decoupling line may follow an edge of the first lighting unit and/or an edge of a housing of the lighting device.

After further development of the invention, an aperture is arranged between the first lighting unit and the second lighting unit, which has partially transparent and/or transparent areas for illuminating a given shape pattern. For example, the shape pattern can be lattice-shaped. This provides a manufacturer-dependent backlighting pattern as a background for the signal light or information function emitted by the first and/or second lighting unit.

The first lighting unit can have a liquid crystal field having a plurality of liquid crystal pixels that are individually controllable. Advantageously, this makes it possible to generate information signals such as welcome light or goodbye light or other information in written and/or symbolic form.

The first lighting unit may have a flat light guide with opposite flat sides and a narrow side connecting the same. A light source can be arranged on the narrow side, by means of which light is coupled into the flat light guide and totally reflected on the opposite flat sides in the direction of light conduction. Scattered optical elements assigned to the flat light guide deflect the coupled light to a front flat side of the flat light guide and decouple it. In this way, a flat illumination can be generated to generate a signal light function, for example a taillight, brake light, direction indicator or daytime running light function. Advantageously, the first lighting unit and the second lighting unit can produce different signal light functions.

Several first lighting units can be arranged in a modular manner next to each other and/or on top of each other, while the second lighting unit is arranged behind this plurality of first lighting units. The plurality of first lighting units and the only second lighting unit can be space-saving, flat with a shallow depth and can follow a predetermined, for example, horizontal line of the luminaire or line of the outer skin of the vehicle. For example, the lighting device can be used on a trunk lid of a vehicle or as a rear light across the entire width of the vehicle.

The light sources of the first lighting unit and the second lighting unit can be arranged on a common printed circuit board, which reduces the manufacturing effort.

The flat light guide of the second lighting unit can be formed of a flexible material on which a plurality of light sources are arranged in recesses on the back. Depending on the arrangement of the light sources on the rear flat side of the flat light guide, backlighting with different illuminances can be generated over the course of the backlighting section. If the light sources emit different light colors or, for example, are designed as RGB LED light sources, a multi-colored light staging can be provided as an animation without the risk of a mixed color. However, if the colored light sources are arranged close enough to each other, a specific mixed color can also be produced in a targeted manner. Advantageously, the invention thus enables a targeted multi-colored backlighting in preferably different areas of the backlighting section of the second lighting unit. For example, the light sources of the second lighting unit may be controlled in a first operating state in such a way that a colored information light function, for example a welcome light function, is generated, and that in a second operating state the light sources are controlled with monochrome red light color to generate the signal light function, taillight or brake light.

The flexible flat light guide of the second lighting unit on a front flat side only may have optical elements in parts for scattering the light, wherein an optical axis of the rear-mounted light source runs in the area. In this way, an increased scattering of the light is provided in extension of the light source, so that no illumination peaks occur at the illumination surface of the second lighting unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
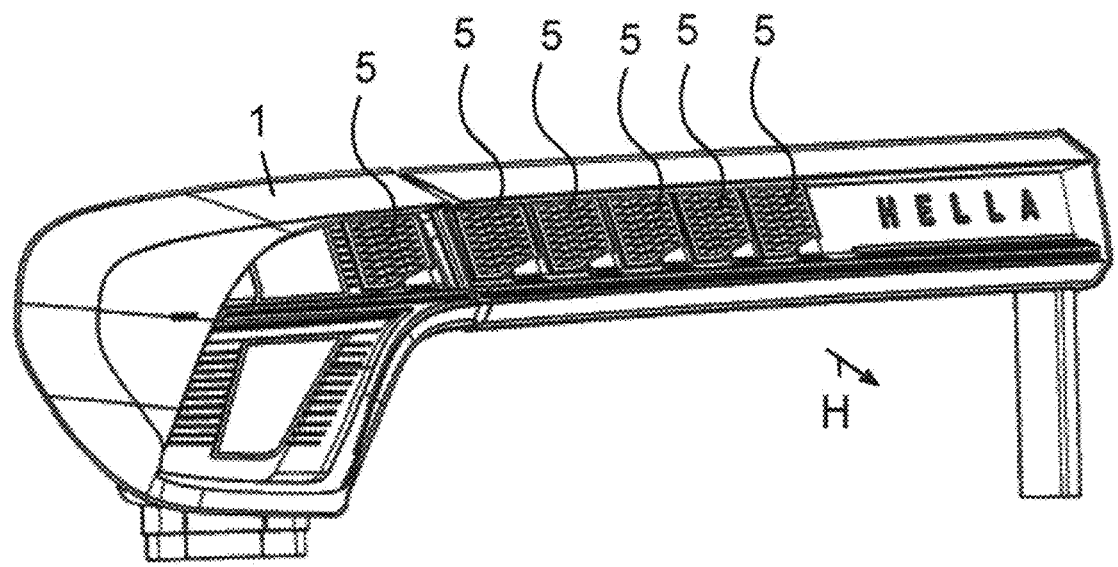
FIG. 1 shows a perspective front view of a lighting device.
Figure 2:
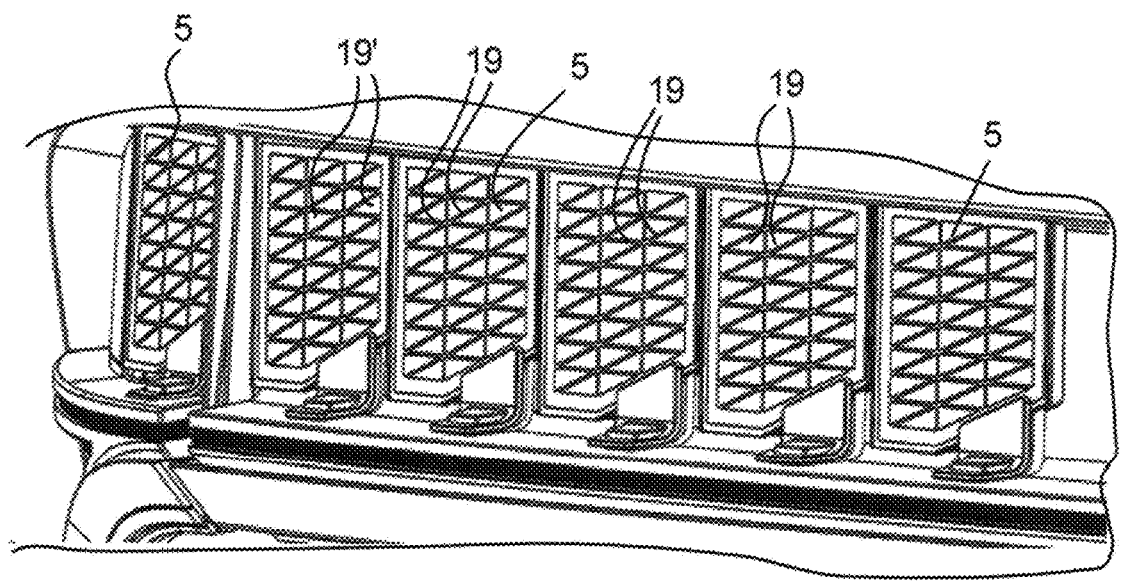
FIG. 2 shows a perspective partial front view of the lighting device.

For example, a lighting device for vehicles can serve as a rear light for generating tail, brake and direction indicator lights. In FIG. 1, a lighting device is designed as a rear light with a housing 1 in which a first lighting unit 2 and a second lighting unit 3 are arranged. The first lighting unit 2 is arranged in the main beam direction H in front of the second lighting unit 3.

The housing 1 is pot-shaped with an opening on the front. The front opening is closed by a light-transparent lens, which is not shown.

The front first lighting unit 2 has a number of light sources 4 and a light beam surface 5, which is formed as a liquid crystal field with a plurality of individually electrically controllable liquid crystal pixels or liquid crystal segments.

The rear second lighting unit 3 has a number of light sources 6 as well as a flat light guide 7, which has opposite flat sides 8, 9 and the same connecting narrow sides 10. As can be seen better from FIGS. 5 and 6, the flat light guide 7 of the second lighting unit 3 has a backlighting section 11 and a linear lighting section 12, which is directly adjacent to the backlighting section 11. The backlighting section 11 and the linear lighting section 12 are connected to each other in one piece. The backlighting section 11 is located behind the light beam surface 5 of the first lighting unit 2. The linear light section 12 is arranged next to the light beam surface 5 of the first lighting unit 2.

In the backlighting section 11, a front flat side 8 of the flat light guide 7 is designed as a light decoupling surface, from which a first part 14 of a light 25 coupled into the flat light guide 7 is decoupled in the direction of the light beam surface 5 of the first lighting unit 2. For this purpose, the flat light guide 7 has 9 decoupling elements 13 in the backlighting section 11 on the rear flat side. The decoupling elements 13 can be produced, for example, by printing or by structuring. The dimensioning of the decoupling elements 13 is in the μm range.

In the linear lighting section 12, the rear flat side 9 has no decoupling elements. In this case, there is only a total reflection of the coupled light 25 in the direction of a narrow side 10", which serves as a light decoupling line for the decoupling of a second part 15 of the light 25 of the light source 6 coupled at an opposite light-coupling narrow side 10'.

Figure 3:
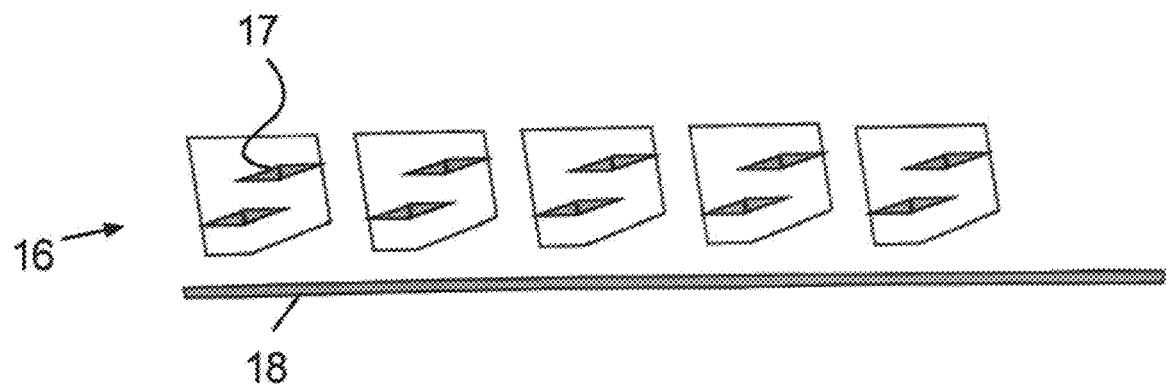
FIG. 3 shows an illumination of the lighting device with a light signature of a first lighting unit according to an example.

As can be seen from FIG. 3, the liquid crystal pixels of the first lighting unit 2 can be controlled in such a way that a first light signature 16 is generated with illuminated diamonds 17 and a light line 18 generated by the second lighting unit 3. The light beam surface 5 of the first lighting unit 2 is formed of several triangular segments 19 (liquid crystal segments), each of which is assigned a liquid crystal pixel. In the first light signature 16, liquid crystal pixels associated with the adjacent illuminated segments 19 are turned on while the others are turned off. The first light signature 16 may be used to produce a signal light function or to produce a decorative light function. For example, the elongated light line 18 can be used to generate a taillight function.

Figure 4:
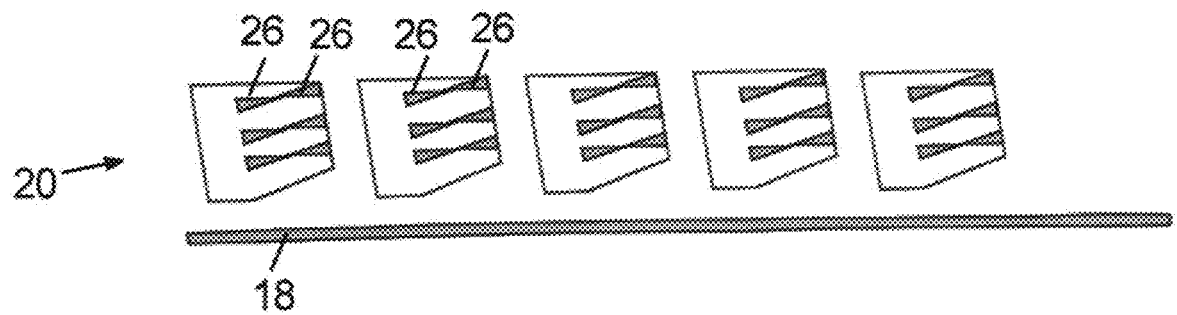
FIG. 4 shows an illumination of the lighting device with a light signature of the first lighting unit according to an example.

According to an example of the invention according to FIG. 4, the first lighting unit 2 may produce a second light signature 20 composed of a plurality of arrowheads 26 touching each other at one point. These are controlled by segments 19' connected by corner edges. This results in a different geometry of the light signature.

Figure 5:
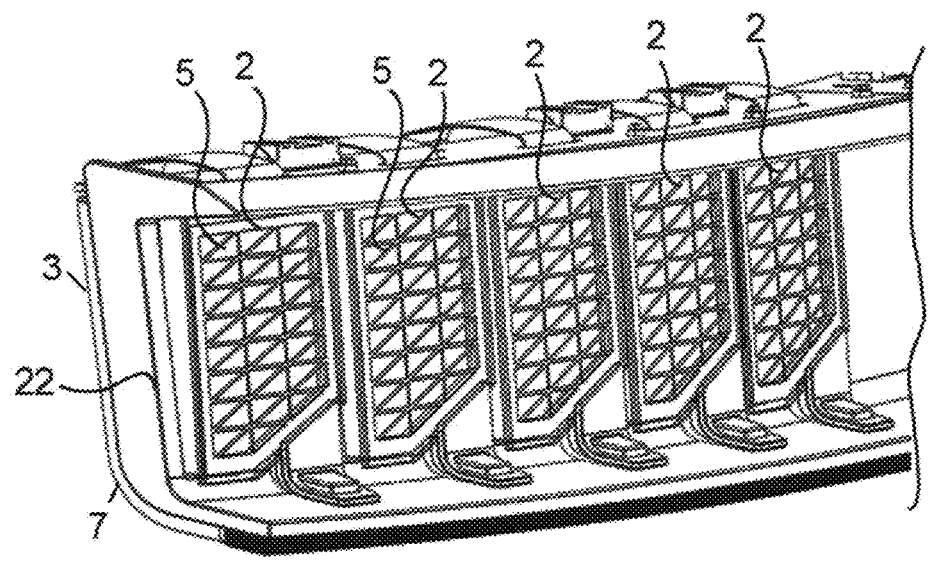
FIG. 5 shows a perspective front view of the lighting device containing an aperture between the first lighting unit and the second lighting unit.

As can be seen from FIG. 1 and FIG. 5, the flat light guide 7 of the second lighting unit 3 engages behind several identically designed first lighting units 2. The light sources 4, 6 of the first lighting unit 2 and the second lighting unit 3 are arranged on a common printed circuit board 21. The lighting device can therefore be relatively space-saving and simple.

For example, an aperture 22 can be arranged between the first lighting unit 2 and the second lighting unit 3, which preferably has partially transparent and/or transparent areas for illumination of a given shape pattern applied to the aperture 22. The backlighting by means of the backlighting section 11 of the second lighting unit 3 can thus be provided with a predefined pattern. For example, the aperture 22 may be made of a transparent disc provided with vaporized and/or painted surfaces. By means of a subsequent laser application process, the areas are lasered free to form the transparent areas of the aperture 22. The other areas remain opaque or partially transparent, so that a specific shape pattern can be created.

The shape pattern of the aperture 22 may also be provided by a printed film laminated or glued to a transparent disc. Alternatively, the printed film may be applied directly to the front flat side 8 of the backlighting section 11, in particular laminated and glued. Alternatively, the aperture 22 can also be designed as an opaque injection molded component with, for example, a lattice-like mold structure.

Figure 6:
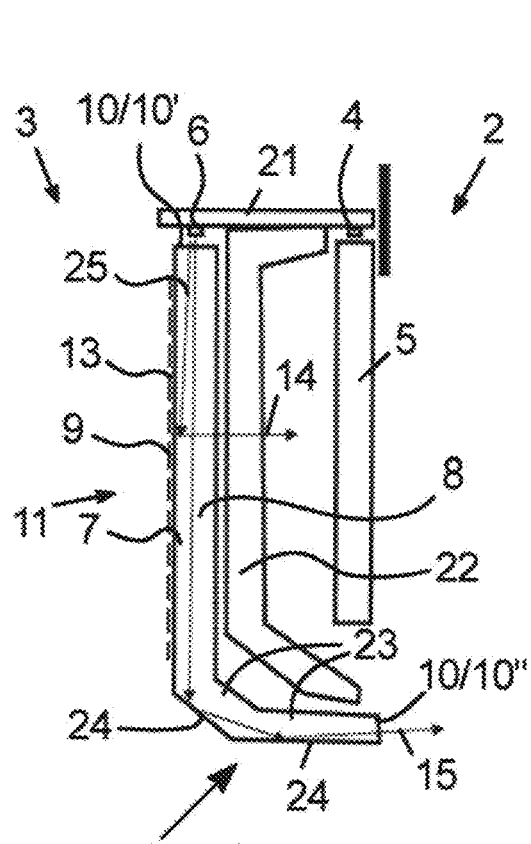
FIG. 6 shows a vertical cross-section through the lighting device.

As can be seen from FIG. 6, in order to deflect the light coming from the backlighting section 11, the linear light section 12 may have planar sections 23 on the front flat side 8 and planar sections 24 on the rear flat side 9. Alternatively, the light deflection section for deflection of the light guidance by 90° can also be arc-shaped.

Figure 7:
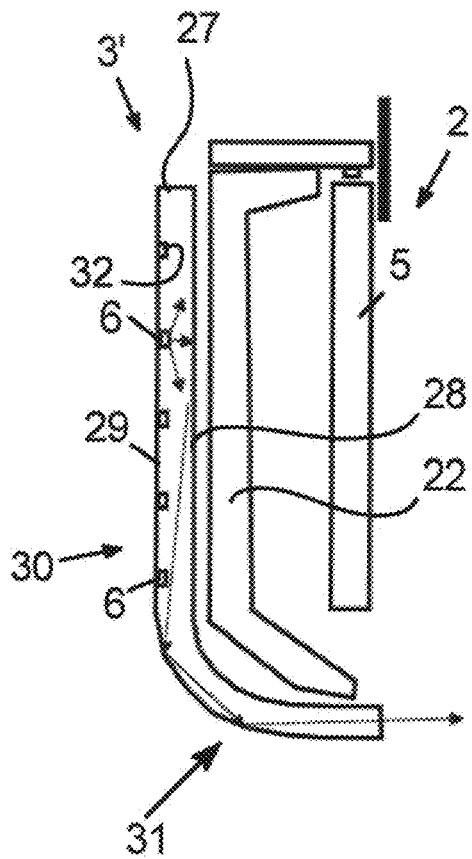
FIG. 7 shows a vertical cross-section through the lighting device with an example of the rear second lighting unit.

According to FIG. 7, an alternative second lighting unit 3' can be provided comprising a flexible flat light guide 27 with opposite front flat sides 28 and a rear flat side 29. The flat light guide 27 has a backlighting section 30 and an arc-shaped linear light section 31, each of which has the same function as the corresponding sections 11, 12 of the second lighting unit 3. The rear flat side 29 can have recesses 32 in the backlighting section 30, in each of which the light sources 6 are arranged. The light sources 6 are preferably designed as LED light sources, which are preferably encapsulated with a transparent silicone material to form the backlighting section 30. The light sources 6 are connected to each other by thin wires, not shown, and are contacted with an unshown laterally arranged connector.

Figure 8:
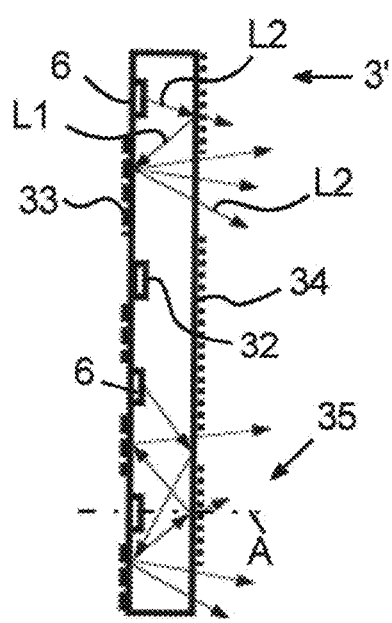
FIG. 8 shows a representation of light rays within a backlighting section of the flat light guide of the second lighting unit.
Figure 9:
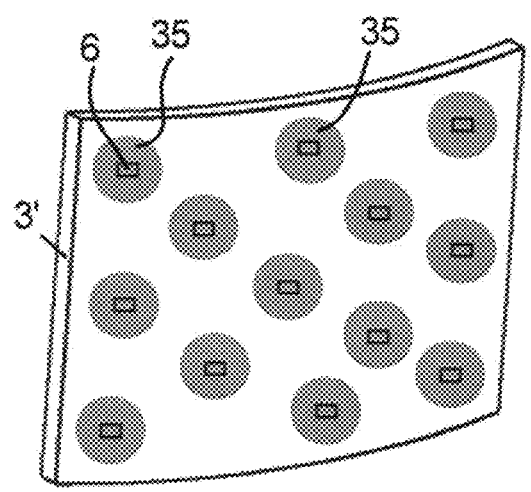
FIG. 9 shows a front view of the backlighting section as shown in FIG. 8.

Preferably, the flat light guide 7 has 29 reflective elements 33 on the rear flat side in the backlighting section 30 and 28 optical elements 34 on the front flat side. This can be done, for example, by appropriate printing. Alternatively, this can also be done by structuring the surface of the front flat side 28 and/or the rear flat side 29. The reflection elements 33 serve as decoupling elements and cause a reflection of the coupled light, wherein example beams L1 are shown in FIG. 8. The optical elements 34 are arranged in a region 35 of the front flat side 28 in which an optical axis A of the light sources 6 extends. Preferably, the region 35 is arranged circularly and/or coaxially to the respective light sources 6. In this way, a scattering of the light directly irradiated by the light sources 6 is caused, which has a homogenizing effect or avoids a light concentration, see example light rays L2 in FIG. 8.

The dimensioning of the reflective elements 33 and the optical elements 34 is in the μm range.

The light sources 6 can be designed as LED light sources, in particular as RGB light sources, so that different light colors are generated over the area of the backlighting section 30. Alternatively, monochrome LED light sources can also be provided, wherein these emit different light colors. In this way, a specific color pattern can be created or a multi-colored light staging in conjunction with the first lighting unit 2.

Further, the light sources 6 of the backlighting section 30 may also emit the same light color.

If the light sources 6 are designed as RGB LED light sources, they can provide a colored backlighting in an initial operating state in which the first lighting unit 2 produces a first light signature function, for example, a welcome light function. In a second operating state, in which, for example, the first lighting unit 2 is switched off, the light sources 6 of the second lighting unit 3' may be switched in such a way that they emit a red light color to generate the signal light function "taillight" or "brake light".

In the regions 35, for example, the printing can be designed as a white dot grid whose dot size and spacing are different. Alternatively, the printing can also have other grid patterns, such as lines, triangles, rectangles, polygons or other geometric shapes. Alternatively, the region 35 can also be provided with a paint of specified residual transmission over the entire surface. The reflective elements 33 are preferably produced by printing, preferably by a white printing, which has a diffuse reflective effect on the coupled light. Preferably, the entire rear flat side 29 in the backlighting section 30, with the exception of the recesses 32, is provided with the reflective element printing.

The backlighting sections may run parallel to the light beam surface 5 of the second lighting unit 3.

Further, the first lighting unit 2 may also be formed by a flat light guide, which corresponds in function and structure to the backlighting section 30 of the second lighting unit 3'. The flat light guide has opposite flat sides and a number of narrow sides connecting the same, wherein a light source is arranged on at least one of the narrow sides for light coupling into the flat light guide and wherein rear and/or front decoupling elements are assigned to the flat light guide, so that the coupled light can be decoupled on a front flat side of the flat light guide, and that preferably the flat light guide is connected to other optical foils. or optical discs.

The first and second lighting units 3, 3' may be provided to produce the same, common signal light function or different signal functions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    a first lighting unit having a light source and a light beam surface for emitting light; and
    a second lighting unit having a light source and a flat light guide having opposite flat sides and same connecting narrow sides for backlighting the first lighting unit,
    wherein the flat light guide of the second lighting unit has a backlighting section and a linear light section adjoining the backlighting section,
    wherein the backlighting section is arranged behind the first lighting unit,
    wherein a front flat side of the flat light guide in the backlighting section serves as a light decoupling surface for the light decoupling of a first part of the light coupled into the flat light guide,
    wherein the linear light section is arranged at least partially next to the first lighting unit, and
    wherein a narrow side of the flat light guide in the linear light section serves as a light decoupling line for the light decoupling of a second part of the light coupled into the flat light guide.

2. The lighting device according to claim 1, wherein an aperture is arranged between the first lighting unit and the second lighting unit with partially transparent and/or transparent areas for illuminating the first part of the light according to a given shape pattern.

3. The lighting device according to claim 1, wherein the light beam surface of the first lighting unit is formed as a liquid crystal field having a plurality of individually electronically controllable liquid crystal pixels or liquid crystal segments.

4. The lighting device according to claim 1, wherein the light beam surface of the first lighting unit has a flat light guide with opposite flat sides and a narrow side connecting them, wherein a light source is arranged on at least one of the narrow sides for coupling light into the flat light guide and wherein rear and/or front decoupling elements are assigned to the flat light guide, so that the coupled light can be decoupled on a front flat side of the flat light guide, and that further optical foils or optical discs can be upstream of the flat light guide.

5. The lighting device according to claim 1, wherein several equally designed first lighting units are located upstream of the backlighting section of the second lighting unit.

6. The lighting device according to claim 1, wherein the first lighting unit runs substantially parallel to the backlighting section of the second lighting unit.

7. The lighting device according to claim 1, wherein a light source of the first lighting unit and a light source of the second lighting unit are arranged on a common printed circuit board arranged on one side of the flat light guide opposite the linear light section.

8. The lighting device according to claim 1, wherein the flat light guide of the second lighting unit if formed of a flexible material with a plurality of recesses accommodating the light sources.

9. The lighting device according to claim 8, wherein the backlighting section of the flat light guide has reflective elements on the rear flat side for reflecting the coupled light and, on a front flat side, has, at least partly, optical elements for scattering the decoupled light.

10. The lighting device according to claim 9, wherein the optical elements arranged on the front flat side are arranged in a region through which an optical axis of the light source assigned to it passes.

11. The lighting device according to claim 9, wherein the reflective elements and/or optical elements are produced by printing and/or by structuring in the μm range.

12. The lighting device according to claim 1, wherein the reflective elements are arranged on the rear flat side of the backlighting section over the entire rear flat side, avoiding the recesses.

13. The lighting device according to claim 1, wherein the light sources are arranged equally distributed on the rear flat side of the backlighting section.

14. The lighting device according to claim 1, wherein the light sources of the first lighting unit and the second lighting unit are designed as LED light sources of a given color or as RGB LED light sources.

15. The lighting device according to claim 1, wherein the first and second lighting units are provided for generating an identical, common signal light function or different signal functions.

* * * * *